US011118736B2

(12) United States Patent
Murray et al.

(10) Patent No.: US 11,118,736 B2
(45) Date of Patent: Sep. 14, 2021

(54) SPACE CONSERVING INTEGRATED CRYOGENIC FLUID DELIVERY SYSTEM

(71) Applicant: Chart Inc., Ball Ground, GA (US)

(72) Inventors: Peter Murray, Cumming, GA (US); Brian Poag, Ball Ground, GA (US); Michael Sable, Cumming, GA (US); Luis Serentill, Cumming, GA (US)

(73) Assignee: Chart Inc., Ball Ground, GA (US)

( * ) Notice: Subject to any disclaimer, the term of this patent is extended or adjusted under 35 U.S.C. 154(b) by 127 days.

(21) Appl. No.: 15/924,779

(22) Filed: Mar. 19, 2018

(65) Prior Publication Data

US 2018/0266629 A1    Sep. 20, 2018

Related U.S. Application Data

(60) Provisional application No. 62/472,706, filed on Mar. 17, 2017.

(51) Int. Cl.
*F17C 13/04* (2006.01)
*F28D 7/16* (2006.01)
(Continued)

(52) U.S. Cl.
CPC ......... *F17C 13/04* (2013.01); *F02M 21/0212* (2013.01); *F02M 21/0221* (2013.01);
(Continued)

(58) Field of Classification Search
CPC .... F17C 7/04; F17C 13/04; F17C 2205/0329; F17C 2205/0332; F17C 2227/0381;
(Continued)

(56) References Cited

U.S. PATENT DOCUMENTS 8,695,357 B2 * 4/2014 Brook ................... F02M 21/06
62/49.1
2002/0171236 A1 11/2002 Joitescu et al.
(Continued)

FOREIGN PATENT DOCUMENTS

CN      203 547 994 U    4/2014
EP      2 765 296 A1     8/2014
(Continued)

OTHER PUBLICATIONS

International Search Report and Written Opinion for PCT/US2018/023020 dated Jul. 10, 2018.
European Search Report for 18162409.9-1004 dated Jun. 4, 2018.

*Primary Examiner* — Brian M King
(74) *Attorney, Agent, or Firm* — Cook Alex Ltd.; R. Blake Johnston (57) ABSTRACT

An integrated cryogenic fluid delivery system includes a tank adapted to hold a supply of cryogenic liquid and having an end wall. A shroud is positioned on the end wall and contains a shell and tube heat exchanger. The heat exchanger includes a shell defining a warming fluid chamber and having a shell inlet and a shell outlet in fluid communication with the warming fluid chamber. A number of cryogenic fluid coils are positioned within the warming fluid chamber and are in fluid communication with a cryogenic fluid inlet port and a cryogenic fluid outlet port. A fuel shutoff valve has an inlet in fluid communication with a liquid side of the tank and an outlet in fluid communication with the cryogenic fluid inlet port of the heat exchanger. A manual vent valve has an inlet in fluid communication with a headspace of the tank and an outlet. The fuel shutoff valve and the manual vent valve each have a control knob that is accessible from the first or second side of the shroud.

13 Claims, 5 Drawing Sheets

(51) Int. Cl.
*F02M 21/06* (2006.01)
*F02M 21/02* (2006.01)
*F28D 21/00* (2006.01)

(52) U.S. Cl.
CPC ........ *F02M 21/0242* (2013.01); *F02M 21/06* (2013.01); *F28D 7/16* (2013.01); *F02M 21/023* (2013.01); *F17C 2205/0326* (2013.01); *F17C 2205/0329* (2013.01); *F17C 2221/033* (2013.01); *F17C 2223/0161* (2013.01); *F17C 2227/03* (2013.01); *F17C 2270/0168* (2013.01); *F28D 2021/0026* (2013.01); *F28D 2021/0033* (2013.01); *F28D 2021/0064* (2013.01); *Y02T 10/30* (2013.01)

(58) Field of Classification Search
CPC ...... F17C 2227/0386; F17C 2227/0393; F17C 2223/0161; F17C 2225/0123; F02M 21/0242

See application file for complete search history.

(56) References Cited

U.S. PATENT DOCUMENTS

| | | | |
|---|---|---|---|
| 2010/0108687 A1 | 5/2010 | Adkins et al. | |
| 2014/0223924 A1* | 8/2014 | Gustafson | F02M 21/0212 62/45.1 |
| 2016/0114674 A1 | 4/2016 | Green | |

FOREIGN PATENT DOCUMENTS

| | | | | |
|---|---|---|---|---|
| EP | 3 021 032 A1 | 5/2016 | | |
| EP | 3021032 A1 * | 5/2016 | ................ | F17C 3/08 |
| EP | 3 093 178 A1 | 11/2016 | | |
| EP | 3093178 A1 * | 11/2016 | ............. | B60K 15/07 |

* cited by examiner

SPACE CONSERVING INTEGRATED CRYOGENIC FLUID DELIVERY SYSTEM

CLAIM OF PRIORITY

This application claims the benefit of U.S. Provisional Application No. 62/472,706, filed Mar. 17, 2017, the contents of which are hereby incorporated by reference.

FIELD OF THE INVENTION

The present disclosure relates generally to cryogenic fluid delivery systems and, more specifically, to a space conserving integrated cryogenic fluid delivery system.

BACKGROUND

Cryogenic fluid delivery systems must often be installed in environments that have considerable space limitations. For example, the components of a system for providing liquid natural gas (LNG) to the engine of an LNG-powered vehicle must be mounted on the chassis of the vehicle, along with the LNG storage tank. As a result, it is often desirable to integrate all of the components of the system, an example of which is provided in FIG. 1, into one assembly. The assembly of components may be positioned within in a shroud, indicated at 5 in FIG. 1, which may be attached to an end wall or head of the tank containing the LNG, as taught in commonly assigned U.S. Patent Application Publication No. US 2014/0223924, the contents of which are hereby incorporated by reference.

Figure 1:
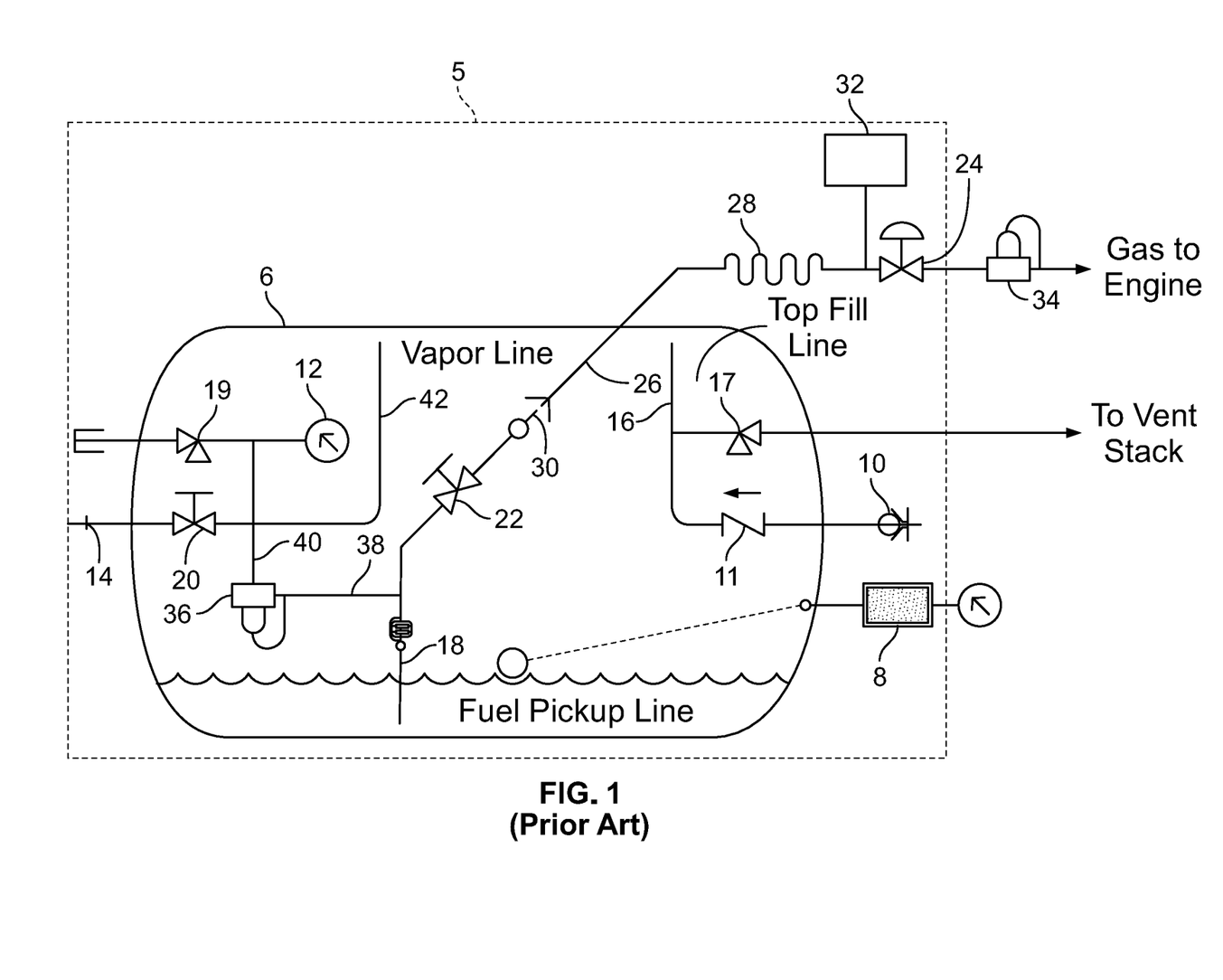
FIG. 1 is a schematic view of a prior art integrated cryogenic fluid delivery system.

The prior art system of FIG. 1 includes a cryogenic tank 6 containing a cryogenic product, such as LNG. A pressure gauge 12 and level gauging system 8 indicate the status of the cryogenic product in the tank. A fill receptacle 10 is provided to fill the tank and a check valve 11 is provided to prevent back flow. More specifically, during filling, LNG enters receptacle 10, travels through the check valve 11 and up fill line 16 to exit into the head space of the tank 6.

Pressure relief devices, such as valves 17 and 19 are used to avoid over-pressurization of the tank 6. Vent valve 20 in conjunction with vent receptacle 14 allow the tank to be depressurized if needed for fueling or maintenance purposes.

A fuel pickup line 18 has a bottom opening in communication with the liquid in the bottom of the tank 6. In normal use of the system, that is, during dispensing or delivery of vaporized LNG, liquid or fuel shutoff valve 22 is open, while manual vent valve 20 is closed. To dispense LNG, or deliver it to the vehicle engine or other use device, automatic delivery valve 24 is opened. Due to the pressure in the head space of the tank, when valve 24 is opened, the LNG travels up line 18 and through line 26, including through valve 22. The LNG then travels through vaporizer 28 which vaporizes the LNG to a vapor phase, which then flows to the use device through valve 24.

One or more features are in place in case of fuel line breakage or rupture. Excess flow valve 30 may be in place to directly sense a flow of LNG though line 26 that exceeds normal operational characteristics at which point the valve 30 closes. Alternatively or in conjunction with the aforementioned feature, low temperature switch 32 can sense the fuel temperature downstream of vaporizer 28 and may signal the closure of automatic valve 24 if necessary. This latter protection protects against failures such as fuel line breakage between the tank 6 and the use device and against failures of the vaporizer 28 itself including insufficient heat exchange fluid flow-both conditions resulting in cold fuel temperature downstream of the heat exchanger.

A delivery pressure regulator 34 may be used to limit pressure delivery of the gas to the use device if the maximum allowable pressure of the use device exceeds the pressure setting of the primary relief valve 17.

Depending upon the system pressure, vapor may be withdrawn from tank 6 through economizer regulator 36 which is connected to fuel pickup line 18 through line 38 and communicates with the head space of the tank through lines 40 and 42. When the vapor pressure in the tank head space exceeds a predetermined level, economizer regulator 36 opens so that vapor from the head space travels through lines 42, 40 and 38 to lines 18 and 26, and ultimately out of the tank through regulator 34.

While, as indicated above, manual vent valve 20 is typically closed, it may be opened during filling to reduce pressure or vent gas back to the fueling station. Manual liquid or fuel shutoff valve 22 may be closed for maintenance purposes.

Prior art systems that feature the components of FIG. 1 typically position the manual vent valve 20 and the fuel shutoff valve 22 so that the face the open rear or back of the shroud 5.

There continues to be a desire to develop cryogenic fluid delivery systems with increased space efficiency, valve accessibility and ease of system installation.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, an integrated cryogenic fluid delivery system includes a tank adapted to hold a supply of cryogenic liquid and having an end wall. A shroud is positioned on the end wall and has a first side, a second side and a bottom wall. A shell and tube heat exchanger is positioned in the shroud and includes a shell defining a warming fluid chamber. The shell has a shell inlet and a shell outlet in fluid communication with the warming fluid chamber. A number of cryogenic fluid coils are positioned within the warming fluid chamber and are in fluid communication with a cryogenic fluid inlet port and a cryogenic fluid outlet port. A fuel shutoff valve has an inlet in fluid communication with a liquid side of the tank and an outlet in fluid communication with the cryogenic fluid inlet port of the heat exchanger. A manual vent valve has an inlet in fluid communication with a headspace of the tank and an outlet. The fuel shutoff valve and the manual vent valve each have a control knob that is accessible from the first or second side of the shroud.

DETAILED DESCRIPTION OF EMBODIMENTS

The embodiments of the system of the disclosure described below provide an integrated delivery system of liquefied natural gas (LNG) from a storage tank to a use device, such as a natural gas powered vehicle engine. It is to be understood that the invention may alternatively be used to deliver or dispense other types of cryogenic fluids.

Figure 2:
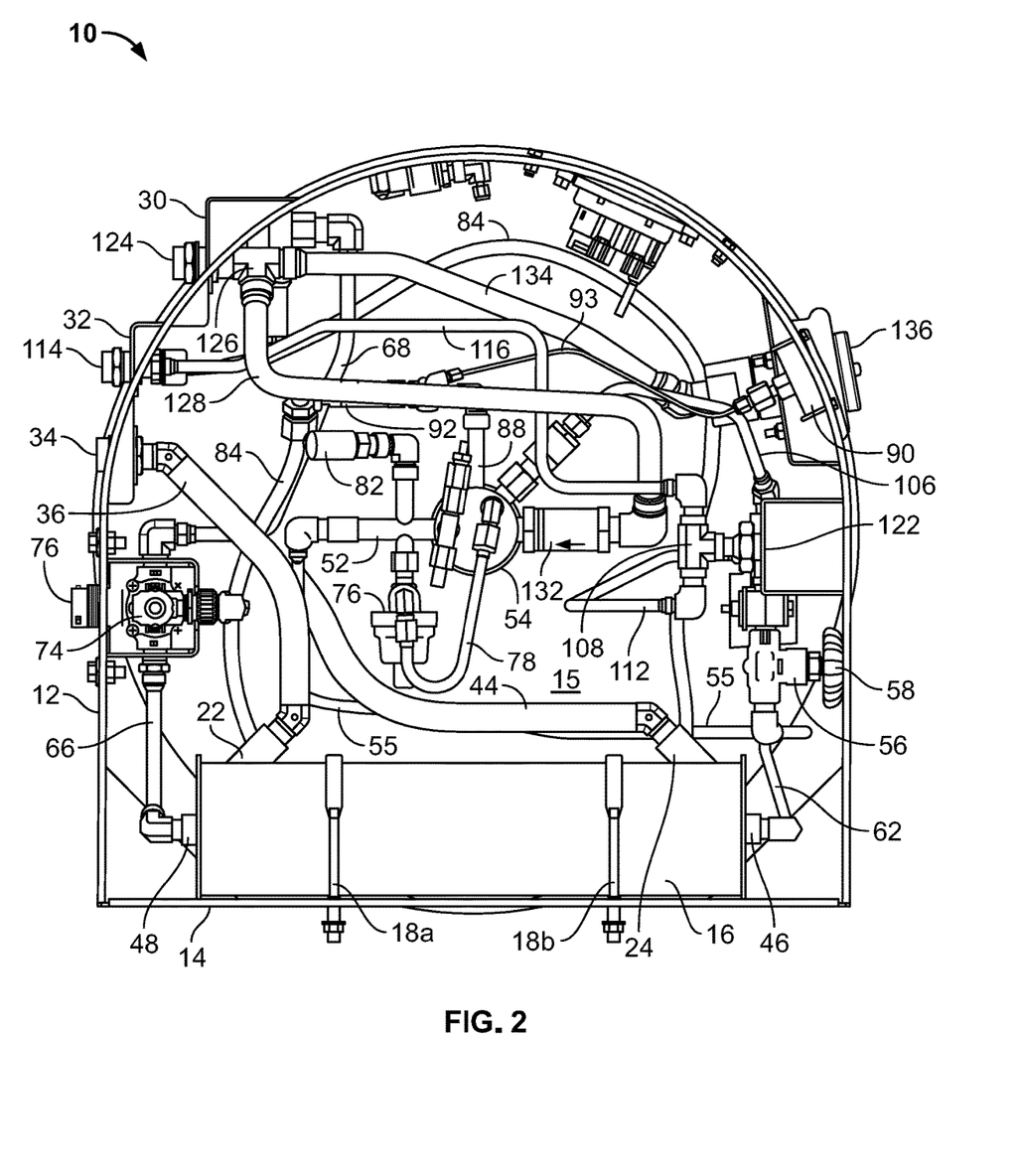
FIG. 2 is a rear elevational view of an embodiment of the integrated cryogenic fluid delivery system of the disclosure.
Figure 3:
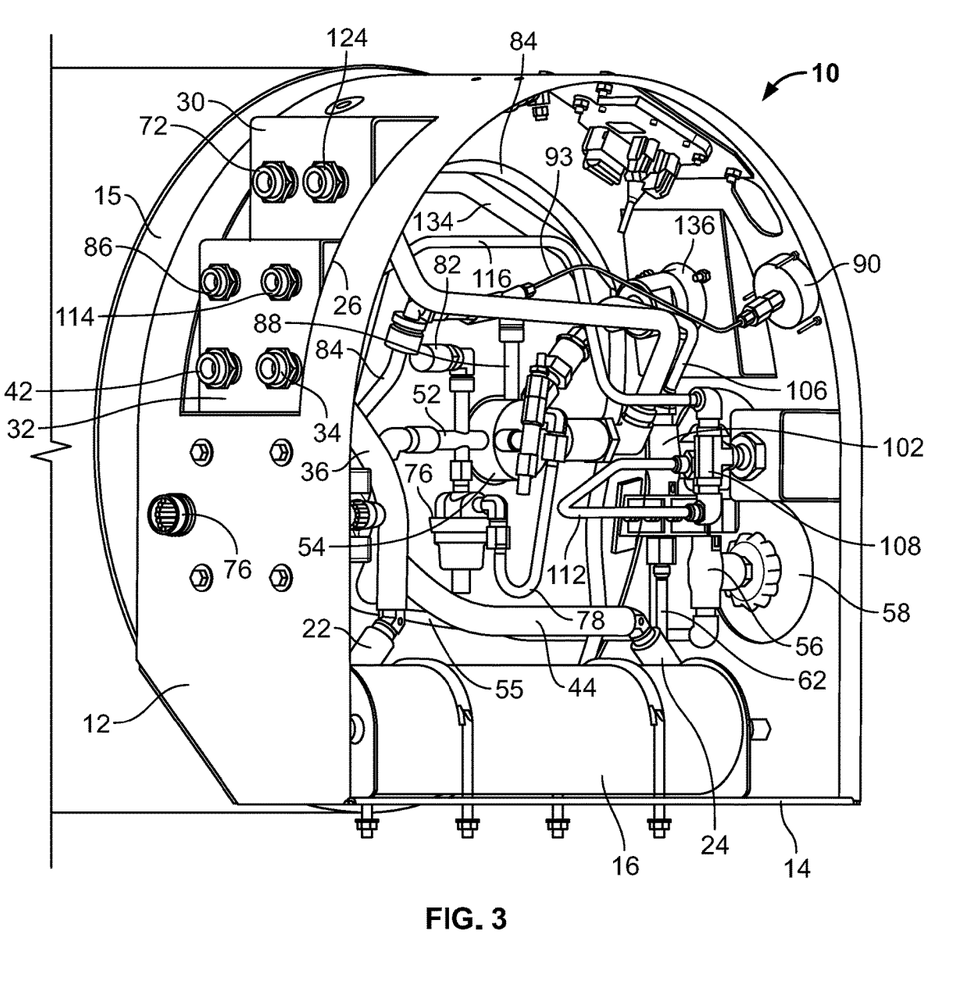
FIG. 3 is a left rear perspective view of the system of FIG. 2.
Figure 4:
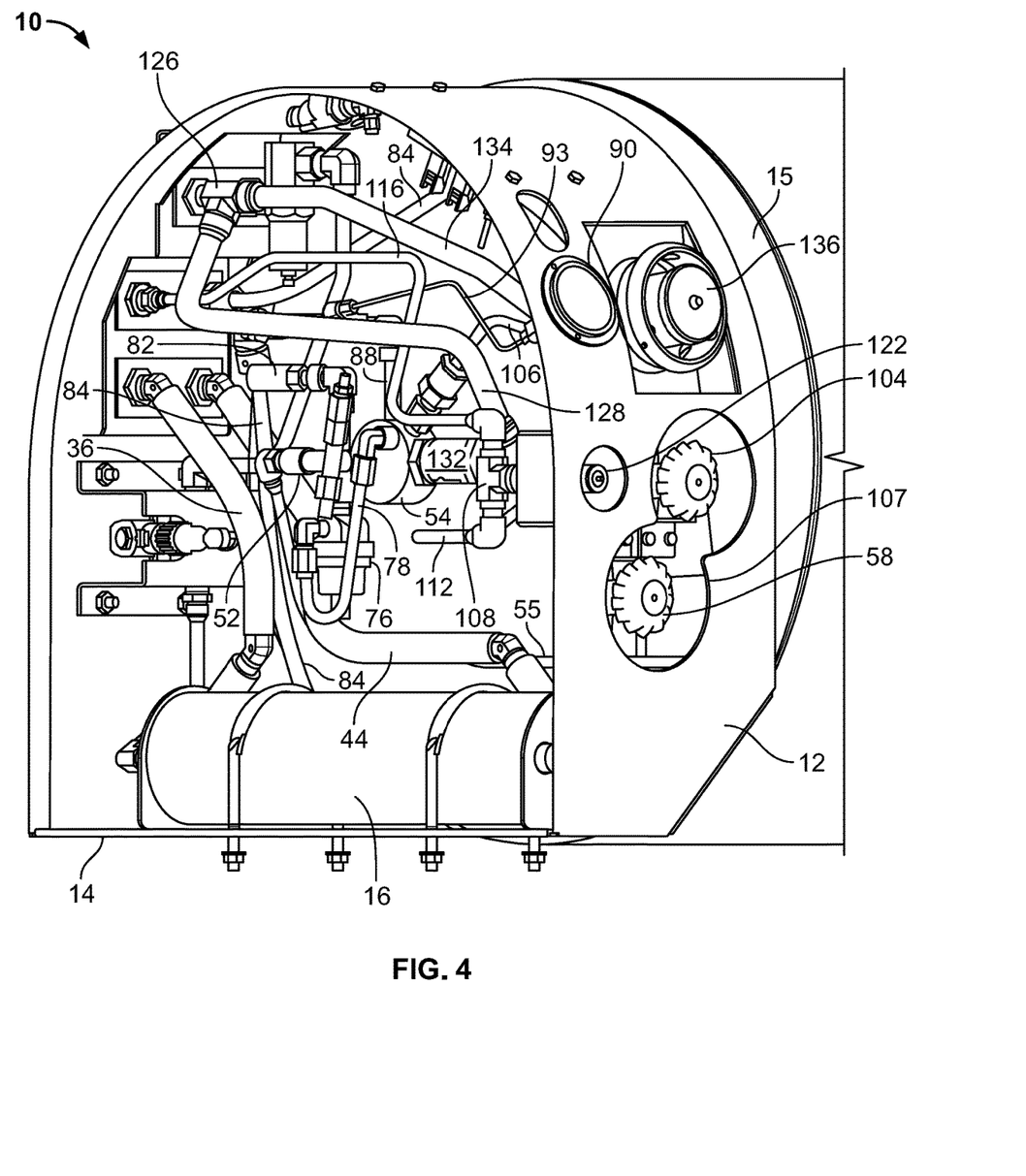
FIG. 4 is a right rear perspective view of the system of FIGS. 2 and 3.

An embodiment of the integrated cryogenic fluid dispensing system of the disclosure is indicated in general at 10 in FIGS. 2-4. The system includes a shroud 12 which may include a generally flat bottom wall 14. The shroud is preferably mounted to the end wall or head of a tank 15, and may have a top with a curvature that matches the curvature of the tank top and sidewalls.

A heat exchanger 16 is mounted upon the bottom wall, such as by U-bolts 18a and 18b. Other arrangements known in the art may be used to secure the heat exchanger 16 within the shroud 12, and other mounting locations within the shroud may be chosen.

As illustrated in FIGS. 2 and 3, the shroud may be provided with an opening 26 through which vertical fitting panels 30 and 32 extend. A number of fittings are mounted within the fitting panels 30 and 32, the functionality of which will be explained below. Such a mounting arrangement permits the fittings to be easily accessed during installation of the tank and system within a vehicle or other environment with limited space.

The heat exchanger 16 is preferably a shell and tube heat exchanger where the shell receives a warming fluid, such as the coolant from a vehicle's engine, via shell inlet port 24. After passing through the shell, the cooled warming fluid exits the heat exchanger via shell outlet port 22. The shell inlet port 24 is attached to a warming fluid inlet fitting 42 (FIG. 3) via line 44, which may be insulated. The shell outlet port 22 is similarly attached to a warming fluid outlet fitting 34 via line 36, which also may be insulated. Fittings 34 and 42 may be connected to a source of warming fluid, such as the cooling system of a vehicle so that fitting 42 receives the warming fluid from the vehicle cooling system, and fitting 34 returns the cooled warming fluid to the vehicle cooling system. As a result, the vehicle coolant circulates through the shell of the heat exchanger 16.

It is to be understood that the term "line" as used herein includes any type of piping, tubing or conduit through which a fluid may flow.

With reference to FIG. 2, the heat exchanger 16 has a cryogenic fluid inlet port 46 and a cryogenic fluid outlet port 48. Line 106 exits the tank 15 through knuckle fitting 54 and is in fluid communication with a liquid side of the tank via a liquid dip tube (such as 18 in FIG. 1) positioned within the tank. As illustrated in FIGS. 2-4, line 106 leads to the inlet of a fuel shutoff valve 102, which has a control knob 104. When fuel shutoff valve 102 is open, due to the headspace pressure in tank 15, LNG travels from the tank, through line 106, through the valve 102 and then through line 62 and into the heat exchanger via inlet port 46, where it is vaporized. The resulting vapor exits the heat exchanger via cryogenic fluid outlet port 48 (FIG. 2). The exiting fluid flows through lines 66 and 68 to fuel outlet fitting 72 (FIG. 3) of fitting panel 30.

An automatic valve (74 in FIG. 2) is positioned between lines 66 and 68 and communicates, via electrical fitting 76 (FIGS. 2 and 3), with a low temperature switch (such as 32 in FIG. 1) that can sense the fuel temperature downstream of the heat exchanger 16. If the low temperature switch detects a low fuel temperature, which would indicate, for example, a failure of the heat exchanger 16 or breakage of the line leading from the system 10 to the vehicle engine (or other use device), the automatic valve 74 closes.

An economizer circuit includes a regulator 76 (FIGS. 2-3) having an inlet that communicates with the headspace of tank 15 via line 52 and an outlet that communicates with line 78, which in turn communicates with line 106. In the event that the pressure in the headspace of tank 15 exceeds the pressure setting of regulator 76, the regulator opens and LNG vapor is supplied from the tank headspace to the line 78 via line 52 so that the LNG vapor travels to line 106 and does not have to be vented. If the pressure within the headspace of the tank 15 rises to a level that further and immediate venting is required, relief venting valve 92 opens. When relief venting valve 92 opens, the vapor from line 88 (which communicates with the tank headspace) is directed through line 84 which leads to vent fitting 86 (FIG. 3) mounted within the venting panel 32. As a result, the headspace of the tank is vented through line 88 when valve 92 is open without passing through the regulator 76. A pressure gage 90 communicates with line 88, and thus the headspace of the tank 15, via line 93. Line 52 is also provided with a venting valve 82 (FIG. 2).

A manual vent valve 56 (FIG. 3) features a control knob 58 (FIG. 4). A line 55 leads from the tank headspace (after passing through knuckle fitting 54 via line 52) to the inlet of the valve 56. The outlet of the manual vent valve 56 communicates with the inlet of a junction 108 via line 112. The junction 108 features an outlet that communicates with a manual vent fitting 114 (FIG. 3) via line 116. A vent receptacle valve 122, using an adapter nozzle, is also in fluid communication with an outlet of junction 108. When the manual vent valve 56 is open, if the pressure in the headspace of tank 15 is excessive, vent receptacle valve 122 is actuated.

As illustrated in FIG. 4, fuel shutoff valve control knob 104 and manual vent valve control knob 58 are preferably accessible through an opening 107 formed in the side of the shroud 12.

The system may be constructed so that the sides featuring the fitting panels 30 and 32 (FIG. 3) and the valve handles 58 and 104 (FIG. 4) may be reversed.

With reference to FIG. 3, a tank refill inlet fitting is provided at 124. The refill inlet fitting is provided with a junction 126 (FIG. 4) having a first outlet that communicates with refill line 128. As shown in FIG. 2, the refill line 128 leads to a check valve 132. When a source of pressurized LNG is connected to the refill inlet fitting 124, LNG flows through line 128, through check valve 132 and fitting 54 and into the tank 15. Junction 126 features a second outlet that communicates with line 134 that leads to a vent valve 136.

Figure 5:
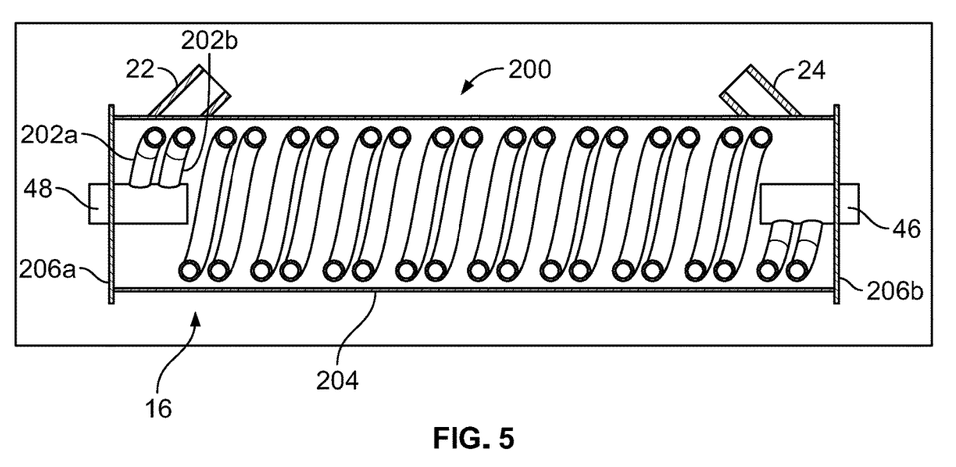
FIG. 5 is a cross sectional view of the heat exchanger of FIGS. 2-4 with a vertical cutting plane taken through the longitudinal axis of the heat exchanger.

Additional details for the heat exchanger 16 of FIGS. 2-4 are provided in FIG. 5. As illustrated in FIG. 5, the heat exchanger is a shell and tube heat exchanger with the shell having a cylindrical main body 204 and end walls or headers 206a and 206b that cooperate to define the warming fluid chamber of the heat exchanger, which receives a warming fluid, such as the coolant of the vehicle, through shell inlet port 24. As described above, the warming fluid leaves the warming fluid chamber of the shell through shell outlet port 22.

A pair of cryogenic fluid coils 202a and 202b (the tubes of the shell and tube heat exchanger 16) are coiled in a parallel fashion and connect at inlet ends to cryogenic fluid inlet port 46 and at outlet ends to cryogenic fluid outlet port 48. As a result, cryogenic fluid from the tank 15 (of FIGS. 2-4) travels through the parallel coils 202a and 202b in parallel flow heat exchange with the warming fluid flowing through the shell warming fluid chamber.

While a pair of cryogenic fluid coils 202a and 202b are illustrated, the heat exchanger may include an alternative number of coils.

As examples only, the shell (204, 206a and 206b) is preferably constructed from stainless steel, while the coils 202a and 202b are also preferably constructed from stainless steel.

The system of the disclosure is particularly suited for users requiring easy assembly and minimal packaging space. Also end users in cold weather climates may benefit.

Embodiments of the system may include components with non-traditional geometry and/or combined functions. The manual vent and fuel shutoff hand valves, by being located to the side of the shroud, provide for easy access, and the valves may be located on either side of the shroud, with both on the same side of the shroud or one on each side of the shroud. In addition, the above embodiments allow the length of the tank to increase in the desired installation location on the vehicle, due to the hand valves being located on the side(s). This results in the ability to provide the user with a larger capacity tank providing increased driving range while still being able to easily access the hand valves. The above embodiments allow for an internal plumbing design that facilitates the location of interface bulkhead fittings that will be used by the user. Locating the fittings on vertical panels allows for direct horizontal piping entry resulting in easier installation of the tank to the vehicle.

While the preferred embodiments of the disclosure have been shown and described, it will be apparent to those skilled in the art that changes and modifications may be made therein without departing from the spirit of the disclosure, the scope of which is defined by the following claims.

What is claimed is:

1. An integrated cryogenic fluid delivery system comprising:
   a. a tank adapted to hold a supply of cryogenic liquid and having an end wall;
   b. a shroud positioned on the end wall, said shroud having a first side, a second side and a bottom wall, said first and second sides each having an upper curved portion and a lower vertical portion where the lower vertical portions of the first and second sides are parallel and the lower vertical portion of the first side has at least one knob access opening;
   c. a shell and tube heat exchanger positioned in the shroud, said heat exchanger including:
      i) a shell defining a warming fluid chamber and having a shell inlet and a shell outlet in fluid communication with the warming fluid chamber;
      ii) a plurality of cryogenic fluid coils positioned within the warming fluid chamber in fluid communication with a cryogenic fluid inlet port and a cryogenic fluid outlet port;
   d. a fuel shutoff valve having an inlet in fluid communication with a liquid side of the tank and an outlet in fluid communication with the cryogenic fluid inlet port of the heat exchanger;
   e. a manual vent valve having an inlet in fluid communication with a headspace of the tank and an outlet;
   f. wherein the fuel shutoff valve has a fuel shutoff valve control knob and the manual vent valve has a manual vent valve control knob with both the fuel shutoff valve control knob and the manual vent valve control knob positioned at least partially within the shroud adjacent to and accessible through the at least one knob access opening of the lower vertical portion of the first side of the shroud.

2. The system of claim 1 further comprising a fitting panel or a plurality of fitting panels upon which are positioned a fuel outlet fitting that is in fluid communication with the cryogenic fluid outlet port, a manual vent fitting in fluid communication with the outlet of the manual vent valve, a warming fluid inlet fitting in fluid communication with the shell inlet and a warming fluid outlet fitting in fluid communication with the shell outlet.

3. The system of claim 2 wherein the shroud features openings through which the fitting panel or plurality of fitting panels pass.

4. The system of claim 2 wherein the fitting panel or plurality of fitting panels are positioned on a side of the shroud opposite the fuel shutoff and manual vent valves.

5. The system of claim 4 wherein the shroud features openings through which the fitting panel or plurality of fitting panels pass.

6. The system of any claim 1 wherein the cryogenic fluid coils are coiled in a parallel fashion.

7. The system of claim 1 wherein the bottom wall of the shroud is flat and the heat exchanger is mounted to the bottom wall.

8. The system of claim 1 further comprising a pressure gage mounted to the first side of the shroud above both the fuel shutoff valve control knob and the manual vent valve control knob, said pressure gage configured to determine a pressure within the tank.

9. The system of claim 8 wherein the pressure gage is mounted to the upper curved portion of the first side.

10. The system of claim 1 wherein both the fuel shutoff valve control knob and the manual vent valve control knob are accessible through a single knob access opening.

11. An integrated cryogenic fluid delivery system comprising:
    a. a tank adapted to hold a supply of cryogenic liquid and having an end wall;
    b. a shroud positioned on the end wall, said shroud having a first side, a second side and a bottom wall, where the first side has at least one knob opening therethrough;
    c. a shell and tube heat exchanger positioned in the shroud, said heat exchanger including:
       i) a shell defining a warming fluid chamber and having a shell inlet and a shell outlet in fluid communication with the warming fluid chamber;
       ii) a plurality of cryogenic fluid coils positioned within the warming fluid chamber in fluid communication with a cryogenic fluid inlet port and a cryogenic fluid outlet port;
    d. a fuel shutoff valve having an inlet in fluid communication with a liquid side of the tank and an outlet in fluid communication with the cryogenic fluid inlet port of the heat exchanger;
    e. a manual vent valve having an inlet in fluid communication with a headspace of the tank and an outlet;
    f. wherein the fuel shutoff valve has a fuel shutoff valve control knob and the manual vent valve has a manual vent valve control knob with both the fuel shutoff valve control knob and the manual vent valve control knob positioned at least partially within the shroud adjacent to and accessible through the at least one knob opening of the first side of the shroud;

g. a pressure gauge mounted to or within the first side of the shroud above both the fuel shutoff valve control knob and the manual vent valve control knob, said pressure gage configured to determine a pressure within the tank.

12. The system of claim 11 wherein the pressure gage is mounted to the upper curved portion of the first side.

13. The system of claim 11 wherein both the fuel shutoff valve control knob and the manual vent valve control knob are accessible through a single knob access opening.

* * * * *